Patented May 21, 1940

2,201,609

UNITED STATES PATENT OFFICE 2,201,609

SIRUP AND METHOD OF MAKING THE SAME

Julian K. Dale, Terre Haute, Ind., and David P. Langlois, Decatur, Ill., assignors to A. E. Staley Manufacturing Company, Decatur, Ill., a corporation of Delaware No Drawing. Application August 9, 1938, Serial No. 223,826

9 Claims. (Cl. 127—30)

The present invention relates to the production of a starch conversion product containing mixed reducing sugars in substantial quantities, and has particular reference to an improved type of sirup produced by a dual type conversion or hydrolysis.

A principal object of the invention is the production of a starch conversion sirup of relatively high sugar content produced by a dual conversion in which initially the starch is subjected to a conditioning and conversion step with an acid to produce a liquor having a dextrose equivalent content or reducing sugar content of at least about 25 per cent, and subsequently subjecting the conditioned liquor to the action of one or more fungus type saccharifying enzymes to increase the sugar content to the desired extent.

An additional object of the invention is the production of a starch conversion sirup having a relatively high sugar content of the order of 55 to 75 per cent dextrose equivalent and having a ratio between the fermentable extract content and the dextrose equivalent content of the order of 0.9:1 to 1.2:1.

Still another object of the invention is the provision of an improved process for the dual conversion of starch in which the starch initially is subjected to a conditioning and conversion step with an acid, the acid treatment being carried far enough to produce in the initial conversion product a dextrose equivalent content sufficiently high that when the conversion product subsequently is subjected to enzyme hydrolysis there will be produced a sirup which is permanently clear, non-crystallizing under normal conditions of use, free from objectionable taste-imparting constituents, and having a dextrose content of at least 20 per cent, a maltose content of at least 20 per cent, a dextrose equivalent analysis of the order of 55 per cent to 75 per cent, a fermentable extract of at least 55 per cent, and a specific rotation of 135 to 100.

A further object of the invention is the provision of an improved acid and enzyme conversion process by which it is possible to obtain a novel starch conversion sirup having many characteristics which make it superior to the well known confectioner's glucose, the improved process involving the use of an enzyme having high maltase activity and also having diastase activity upon acid converted intermediate liquors of relatively high dextrose content of the order of 25 per cent or more. These and other objects will be understood upon a consideration of the following description of a preferred embodiment of the invention.

Confectioner's glucose is produced by the acid conversion of starch to an intermediate extent, the products being non-crystallizing and of relatively mild sweetness. When corn starch is used to produce the glucose, the product often is referred to as "corn sirup unmixed". Use of the term "glucose" herein is with reference to sirups of the confectioner's glucose and corn sirup unmixed type as distinguished from the sugar, dextrose. Large quantities of glucose are sold for use in table sirups and for incorporation in bakery products, confectionery products and the like. Normally the dextrose equivalent content of glucose is of the order of 40 to 50 per cent, although lower "purity" glucose having a dextrose equivalent content of around 30 to 35 per cent sometimes is produced for such purposes as body sirup in the brewing industry. Higher "purity" glucose having a dextrose equivalent content exceeding 45 per cent also has been produced by acid conversion of starch, but if the acid conversion is carried much further than necessary to produce a dextrose equivalent of 55 to 60 per cent, there develops a bitter hydrol taste and the resulting sirup has a definite tendency toward crystallization, these factors making the sirup unsuitable for use as such.

By carrying the acid conversion of starch considerably further than is necessary for the production of glucose it is possible to produce a crystallizable sugar from which dextrose may be obtained. In these high conversion products there is produced a bitter tasting by-product from which the dextrose must be separated before the latter is suitable for consumption as a food product.

In accordance with the present invention there is produced a new type of starch conversion sirup which may have an even higher reducing sugar content, preferably of the order of 55 to 75 per cent, than straight acid converted glucose available heretofore, the new sirup having many characteristics which make it highly desirable as a commercial product.

An initial step in the production of the improved starch conversion sirup consists in subjecting an aqueous starch suspension to a particular conversion and conditioning treatment with an acid, the acid treatment being carried out more particularly as will be described hereinafter. Following the particular acid treatment the resulting intermediate conversion product is subjected to the action of a saccharifying enzyme having maltase and diastase activity to increase its sugar content and to develop other desirable characteristics.

An initial step in the production of the new type of sirup consists in conditioning a starch suspension by acid treatment to an extent substantially beyond the point at which starch is solubilized and to a point at which the acid conditioned product has a relatively large reducing sugar content which may be of the order of at least one-fourth the solids comprising the liquor, the dextrose equivalent content of the liquor resulting from the acid conversion preferably being of the order of 38 to 60 per cent of the solids content. If the dextrose equivalent content is much below 25 per cent after the initial acid treatment, a satisfactory sirup is not obtained, this apparently being due to an inadequate conditioning of the starch for the enzyme treatment.

It is preferred to use a starch product having less than about 0.1 per cent solubles. For the initial acid conversion there may be employed a starch suspension of a density corresponding to about 10° to 25° Baumé (60° F.). A starch suspension of 3.1 pounds dry starch per gallon is a desirable concentration.

The starch slurry is mixed with aqueous hydrochloric acid containing about 6.2 pounds of HCl per 1000 gallons of the slurry and the mixture is boiled at atmospheric pressure until thoroughly pasted. In the pasting step the mixture may have a pH of about 1.6 to 1.8.

The pasting operation is followed by subjecting the starch to a pressure conditioning and conversion step to the extent necessary to produce a liquor having a dextrose equivalent content of at least 25 per cent. This operation includes the use of a pressure converter having a steam injector by which the temperature of the mixture is brought to a point corresponding to about 35 pounds gauge pressure. The pressure cooking is continued for a period of time sufficient to develop in the conversion product a dextrose equivalent content of at least 25 per cent, but insufficient to produce a bitter tasting product. Depending upon other operating conditions, this period may be of the order of 9 to 12 minutes. Thereafter the charge is released and treated with a sufficient quantity of a neutralizing agent such as sodium carbonate to provide a pH of about 4.6 to 5.0.

This acid conditioning treatment will provide a conversion liquor having a sugar content which may be well in excess of 25 per cent of the liquor solids and preferably between about 45 and 55 per cent dextrose equivalent content. The conversion by acid to this extent is far beyond the extent necessary to solubilize the starch, as is evidenced by the high sugar content and the permanent clarity of the liquor upon subsequent treatment. In general the acid conversion treatment follows well known principles and conditions familiar to the industry in the production of glucose, and the characteristics of the resulting intermediate product in so far as the present invention is concerned may be those of a normal acid treated starch conversion product. It is preferred in many cases to carry the acid convesion well above 40 per cent dextrose equivalent, as this extensive acid conversion seems to condition the material particularly well for the subsequent enzyme conversion.

The neutralized liquor from the acid conversion is prepared for enzyme conversion. This preparation generally includes a clarification operation as by filtration with the use of diatomaceous earth as a filter aid.

Following the filtration the liquor may be decolorized by treatment with bone char or activated carbon.

After the carbon treatment the liquor is concentrated in a vacuum evaporator to 20° to 35° Baumé and preferably to between 25° and 30° Baumé.

A further step in the preparation of the acid conversion product includes the adjustment of the pH of the liquor to the point most suitable for the optimum action of the selected enzyme. For purified enzymes from molds the pH of the liquor is brought up to about 5.5 by the addition of sodium carbonate.

When produced in the manner described the starch conversion liquor is conditioned and prepared for controlled saccharifying enzyme treatment to produce a novel type of sirup.

The enzymatic treatment is carried out at a temperature favorable to the action of the selected enzyme. In the case of fungus enzymes this temperature may be between 110° and 160° F. and preferably within the range of 125° to 145° F. The liquor is brought to the temperature proper for enzymatic treatment with the particular enzyme being employed and an enzyme having the desired activity is added. By employing a purified enzyme of this type it is possible to produce the desired conversion by utilizing a quantity of the enzyme preparation of the order of 0.05 to 0.1 per cent based on the dry solids of the starch conversion liquor. After the addition of the desired quantity of the enzyme the mixture is gently agitated for about 48 hours, the temperature of the liquor being controlled during this period to facilitate the enzymatic action.

The conditions of the enzymatic conversion step are controlled to give optimum results for the particular enzyme employed. The time will depend upon such factors as the nature and quantity of enzyme and the other process factors. When the secondary saccharification has proceeded to the extent necessary to produce a sirup of the desired characteristics, the enzyme may be rendered inactive by raising the temperature of or concentrating the conversion liquor, or otherwise. A temperature of 170° F. maintained for 10 or 15 minutes is generally sufficient to inactivate mold enzymes.

After completion of the enzymatic conversion the liquor again is decolorized through the bone char or activated carbon. The char treatment may be conducted at a temperature of between 150° and 170° F. and it is desirable that the pH of the liquor again be reduced to between 4.8 and 5.0, the reduction in pH being favorable to stability of the sirup with respect to color change upon aging.

A second concentration step then is effected in the vacuum evaporator under about 4 to 6 inches absolute pressure, the density of the liquor preferably being raised to 39° to 46° Baumé to complete the operation.

During the enzymatic conversion the chemical and physical characteristic of the liquor change considerably to produce a novel type of sirup. These changes include an increase in the sugar content of the liquor, a change in the nature of the complex polysaccharides, decreases in the specific rotation and viscosity of the sirup, and an increase in sweetness, without development of bitter-tasting products or crystallization characteristics under normal conditions of commercial use.

The nature of the enzymatic action is not entirely clear. The acid treatment produces in addition to dextrose and maltose complex polysaccharides of the dextrin type, which are of such nature as to favor the enzyme conversion without the production of bitter tasting products. Unless the initial acid treatment has been carried out to produce the type of sirup described, a satisfactory product is not produced by the enzymatic conversion. This indicates a conditioning of the material by the substantial acid treatment which is favorable to the activity of the enzyme.

With any particular enzyme the conversion activity depends upon such factors as the hydrogen ion concentration and specific gravity of the substrate and the temperature at which the substrate is maintained during the conversion. The extent of the enzymatic conversion also depends upon the amount of the enzyme preparation employed in the process and the length of time allowed for its action. These factors are interrelated. For example, to reach a definite degree of conversion a relatively small amount of enzyme may be allowed to act on the liquor for a relatively long time or a larger amount of enzyme may be employed for a shorter period.

There are a number of enzyme preparations available commercially in purified form which will provide the desired conversion characteristics. Purified enzymes derived from mold fungi have proven to be very desirable in this use. The production of the fungus enzyme may be effected by inoculating wet sterilized bran with spores of the desired fungus and drying the bran at a mild temperature after four or five days growth of the culture. Thereafter the enzyme may be purified by extraction from the bran with water and precipitation from the water with alcohol. Among the fungi enzymes which have been employed in the operation of the process are *Aspergillus oryzae, Aspergillus flavus, Aspergillus niger, Aspergillus wentii, Monilia sitophila, Rhizopus nigricans,* and *Rhizopus tritici*. Each enzyme strain will have process conditions which are optimum to its conversion capacity. By employing fungus types of enzymes for the secondary saccharifying action it is not necessary to carry the initial acid conversion close to the danger point at or beyond which it is difficult to prevent the formation of undesirable taste and color-imparting impurities. The saccharifying effect of the fungus enzymes includes an increase in the sugar content of the liquor at the expense of the partial conversion products of the acid conversion liquor, and this increase involves substantial increases in both the dextrose and maltose contents as well as in the fermentable extract content.

The dual conversion process described results in the production of a starch conversion sirup of novel characteristics. These characteristics are dependent upon a proper conduct of the initial acid treatment in which the acid conversion is carried to produce a liquor of at least 25 per cent dextrose equivalent content and preferably of at least as high a dextrose equivalent content as commercial glucose.

The analytical data given herein in terms of per cent are calculated on the dry substance of the syrup as determined according to Fetzer and Evans, Industrial and Engineering Chemistry 28, 885 (1936).

Reference herein to the "dextrose equivalent" content of the sirup is with respect to the official Munson and Walker methods of analysis as described in "Official and Tentative Methods of the A. O. A. C.", fourth edition, page 482, which is based upon a copper reduction value and includes the various reducing sugars contained in the sirup calculated as dextrose.

The dextrose content of the sirup is determined directly by the method of Sichert and Bleyer, Z. Anal. Chem. 107, 328–38 (1936).

The maltose content of the sirup as referred to herein is based upon the difference between the dextrose content and the "fermentable extract" content. The fermentable extract is determined by weighing out sufficient sirup to give 30 grams of dextrose as calculated from the dextrose equivalent content. This amount of the sirup is diluted with water to a volume of about 300 cc. To the diluted sirup are added 2 grams of commercial bakers' yeast and an equal amount of a yeast food such as Bacto Yeast Extract powder (Digestive Ferments Co., Detroit). The mixture is allowed to ferment at room temperature in a flask fitted with a Bunson valve until the loss of weight does not exceed 0.3 gram in 24 hours. Ordinarily 5 days are sufficient for completion of the fermentation step. The alcohol produced in this fermentation step then is determined by the method of A. O. A. C., fourth edition, page 149. The fermentable extract is calculated from the alcohol determination by the following formula:

$$\frac{\text{Total alcohol yield}}{\text{Dry substance of sirup}} \times 2 \times 100$$

As an example of the operation of the process, a batch of starch slurry was subjected to acid hydrolysis in the manner described to produce a starch conversion sirup having a dextrose equivalent content of 58.7 per cent and a fermentable extract content of 51.8 per cent. After neutralization and filtration this liquor was concentrated to 30° Baumé and its pH was adjusted to 5.5. To the liquor then was added 0.05 per cent purified *Aspergillus oryzae* enzyme, the sirup being maintained for 48 hours at 126° F. Thereafter the enzyme was inactivated by heating to 175° F. for fifteen minutes and the sirup was decolorized with activated carbon. The decolorized sirup was concentrated to 43.75° Baumé. Upon analysis the concentrated sirup showed a dextrose equivalent content of 65.8 per cent, a specific rotation of 112.0, a fermentable extract of 64.0 per cent, and a ratio between the fermentable extract and dextrose equivalent of 0.972. It was sweet to the taste and permanently clear, and did not crystallize upon standing for an extended period.

In another example of the process the acid conversion was carried to produce a sirup having a dextrose equivalent content of 29.5 per cent. After enzyme conversion under controlled conditions there resulted a sirup having a dextrose equivalent content of 57.6 per cent, a specific rotation of 131.0, a fermentable extract content of 63.2 per cent, and the ratio between the fermentable extract content and the dextrose equivalent content of 1.095.

Another acid conversion was carried to about the extent of commercial glucose, the particular dextrose equivalent analysis of the acid converted sirup being 44.3 per cent. After enzymatic conversion the sirup had a dextrose equivalent analysis of 57.6, a specific rotation of 130.2, a fermentable extract content of 56.4, and a ratio between the fermentable extract content and dextrose equivalent content of 0.975.

Typical analysis of enzyme converted sirups produced from initially acid converted sirups in accordance with the present invention are as follows:

| Batch No. | DE of acid sirup | Final DE | Per cent D | Per cent FE | Per cent M | Ratio FE/DE | Ratio D/M | Specific rotation |
|---|---|---|---|---|---|---|---|---|
| 1 | 43.8 | 60.8 | 36.4 | 58.2 | 21.8 | 0.96 | 1.67 | 123.8 |
| 2 | 44.0 | 64.9 | 40.1 | 66.0 | 25.9 | 1.02 | 1.55 | 118.0 |
| 3 | 56.2 | 65.0 | 45.4 | 70.4 | 25.0 | 1.08 | 1.81 | 109.0 |

In the above table "DE" refers to dextrose equivalent, "D" refers to dextrose, "FE" refers to fermentable extract, and "M" refers to maltose.

The desirable characteristics of the sirup seem to be related closely to the ratio of the fermentable extract to the dextrose equivalent. Proper operation of the dual conversion process results in a sirup in which this ratio does not fall below about 0.90 or rise above about 1.2. It is preferred to exercise closer control to produce a sirup in which the ratio of fermentable extract to dextrose equivalent falls within the range of 0.95 to 1.1. This control may be exercised by balancing the extent of the initial acid conversion with respect to the extent of the enzyme conversion. The dual converted sirup has a higher ratio of FE/DE than an acid converted sirup of the same DE, and a lower ratio than malt sirups.

It is a characteristic of sirups produced in accordance with the present invention that they have a lower dextrose content than straight acid converted sirups of the same dextrose equivalent analysis. Also, the improved sirups contain approximately twice as much maltose as straight acid converted sirups of the same dextrose equivalent analysis. It is possible that this balance between the dextrose and maltose content in the improved sirups lends to it its stable characteristics.

The taste characteristics of the improved sirup are somewhat different from the taste characteristics of sirups known heretofore, and these taste characteristics make the improved sirup desirable for use in products where undesirable taste characteristics are easily discernible. This possibly is due to the change in the nature of the complex polysaccharides which occurs during the enzyme conversion. The sirup is considerably sweeter than acid converted sirups of the confectioner's glucose type, and even though the sugar content of the improved sirup is high it may be stored for extended periods of time without crystallization. In appearance the sirup is clear and of low color. On standing for extended periods the sirup does not develop a milky or cloudy appearance.

In addition to the dextrose and maltose content of the sirup, each of which constitutes at least 20 per cent of the solids, the sirup contains other compounds of unknown chemical composition, but such other compounds apparently are not reversion products since they do not impart to the sirup the disagreeable taste and color characteristics of sirups produced by straight acid conversion and of similar dextrose equivalent content but having a substantially lower ratio between the fermentable extract content of the sirup and the dextrose equivalent content.

The fermentable extract content of our sirup constitutes 15 to 30 per cent more of the solids of the sirup than does the dextrose content. The percentage of maltose present in the sirup may be between about 20 and 27 per cent.

The viscosity of the sirup will vary considerably, but generally will be found to be within the range of 100 to 150 poises for a sirup of a density corresponding to 43° Baumé at 95° F., which is substantially lower than the viscosity of confectioner's glucose.

The specific rotation of the improved sirup will depend upon the conditions of the dual conversion process, but in general will lie between 100 and 135, based on the dry solids content of the sirup.

An alternative method of conducting the enzyme hydrolysis consists in adding the desired quantity of the purified enzyme in a stepwise fashion. That is, a fraction of the enzyme quantity is added periodically during the second conversion step, so as to make sure that there is present at all times in the sirup a relatively fresh enzyme. Although the stepwise addition of the enzyme may be found desirable in many cases, it is not necessary or essential to the production of the improved sirup, and in either method of conducting the enzyme conversion if the acid conversion initially has been carried out far enough there will be produced a sirup having the desired ratio between the fermentable extract content and dextrose equivalent content.

The factors of hydrogen ion concentration, specific gravity of the liquor undergoing the enzymatic treatment and the temperature employed during the enzymatic action may be established to produce the desired results with the particular enzyme which is employed, and the factor of time will depend upon the quantity and nature of the enzyme, the particular operating conditions, the dextrose equivalent of the acid converted liquor, and the extent to which the final conversion is to go. Some enzyme preparations will have greater activity than others, which will have a bearing upon the amount of the enzyme to be used. The overall cost of the process may determine the amount of enzyme as related to the time factor involved.

In some cases it will be desirable to add the enzyme with some other material. Thus, the enzyme preparations may be standardized for activity per unit weight by admixture with the proper amount of a substance such as dextrose. The amount of the enzyme mixture added to the sirup may depend upon the extent of incorporation of other materials. When mold enzymes are employed it is preferred that the amount of the preparation be such as to provide between 0.01 and 0.5 per cent of enzyme substance exclusive of diluents. A greater quantity of the enzyme preparation may be used but this tends to introduce an undue amount of protein material into the sirup.

The initial starch conversion is carried out with a suspension of relatively low density, as is customary in acid conversion processes, while the enzymatic conversion proceeds best at an intermediate density as compared with the final sirup. Thus, the densities of the starch suspension, the enzyme liquor, and the final product may be 18° Baumé, 30° Baumé and 43° Baumé, respectively. Between each change in density the liquor is clarified.

As will be seen from the description of the invention, both the product and process are susceptible of considerable variation without departing from the scope of the invention, and such variations are intended to be included in the appended claims.

We claim:

1. The process which comprises subjecting an aqueous starch suspension to acid conversion to produce a liquid having a dextrose equivalent analysis between 25 and 60 per cent, and subjecting said liquid to further conversion with a concentrated saccharifying enzyme obtained from fungus.

2. The process which comprises subjecting an aqueous suspension of starch to acid conversion to produce a liquor having a dextrose equivalent content of between 38 and 60 per cent, and subjecting the liquor to the action of a diastatic enzyme to increase the dextrose equivalent content to between 55 and 75 per cent.

3. The process which comprises subjecting an aqueous starch suspension to acid hydrolysis to produce a conversion product having a dextrose equivalent content of more than about 25 per cent and below the point at which undue quantities of undesirable taste and color-imparting constituents are formed, subjecting said conversion product to evaporation to produce an intermediate concentrated conversion product having a Baumé of between 20° and 35°, subjecting the concentrated product to the action of a saccharifying enzyme to produce a liquid having an increased dextrose equivalent content, and subjecting said liquid to a further evaporation step.

4. A starch conversion product of the type described, comprising a non-crystallizing sirup having a dextrose equivalent analysis of between 55 and 75 per cent, a dextrose content of more than 20 per cent, a maltose content of more than 20 per cent, a fermentable extract content of more than 55 per cent, a ratio of fermentable extract to dextrose equivalent of between 0.9 and 1.2, and a specific rotation of between 135 and 100.

5. The process which comprises subjecting an aqueous starch suspension to acid hydrolysis to produce a conversion liquor having a dextrose equivalent content of more than about 25 per cent and less than that at which undue quantities of undesirable taste and color-imparting constituents are formed, subjecting the conversion liquor to the action of an enzyme preparation having diastatic and maltase activity to produce a sirup having an increased dextrose equivalent content, and subjecting the resulting sirup to a concentration step.

6. The process which comprises subjecting an aqueous starch suspension to a conditioning treatment with an acid to produce a conversion liquor having a dextrose equivalent content of between 25 and 60 per cent and a Baumé of less than about 20°, adding an alkaline material to the acid treated liquor, concentrating the liquor to between 20° Baumé and 35° Baumé, subjecting the concentrated liquor to the action of an enzyme preparation having diastatic and maltase activity to produce a sirup having a dextrose equivalent content of between 55 and 75 per cent, and subjecting the sirup to a further concentration operation.

7. The process which comprises subjecting an aqueous starch suspension to acid hydrolysis to produce a starch conversion liquor having a dextrose equivalent content of more than about 25 per cent and below that at which undue quantities of objectionable taste and color-imparting substances are formed, and subjecting the starch conversion liquor to the action of a saccharifying enzyme for a period of time sufficient to increase the dextrose equivalent content to above 55 per cent without developing in said liquor substantial quantities of unpleasant tasting conversion products, said enzyme being added in increments at different intervals during said time.

8. The process which comprises subjecting an aqueous starch suspension to acid conversion to produce a liquor having a dextrose equivalent analysis between 25 per cent and 55 per cent, and subjecting said liquor to the action of a saccharifying fungus enzyme to the extent necessary to produce a sirup having a dextrose equivalent content of 55 to 75 per cent, a fermentable extract content of more than 55 per cent, a maltose content of between substantially 20 per cent and 27 per cent, and a ratio between fermentable extract content and dextrose equivalent content of not more than 1.1.

9. A starch conversion product of the type described, comprising a non-crystallizing sirup having a dextrose equivalent analysis of between 55 and 75 per cent, a dextrose content of more than 20 per cent, a maltose content of between 20 and 27 per cent, a fermentable extract content of more than 55 per cent, and a ratio of fermentable extract content to dextrose equivalent content not exceeding 1.1.

JULIAN K. DALE.
DAVID P. LANGLOIS.

CERTIFICATE OF CORRECTION.

Patent No. 2,201,609. May 21, 1940.

JULIAN K. DALE, ET AL.

It is hereby certified that error appears in the printed specification of the above numbered patent requiring correction as follows: Page 1, second column, line 14, for the numeral "50" read --45--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.